United States Patent
Klosterberg et al.

(10) Patent No.: US 12,158,130 B2
(45) Date of Patent: Dec. 3, 2024

(54) CYLINDER HEAD FOR AN INTERNAL COMBUSTION ENGINE

(71) Applicant: DEUTZ Aktiengesellschaft, Cologne (DE)

(72) Inventors: Johannes Klosterberg, Swistal (DE); Janine Queren, Cologne (DE); Klaus-Peter Bark, Duerrholz (DE); Georg Töpfer, Cologne (DE); Manuel Hirmer, Cologne (DE); Benedikt Nork, Cologne (DE); Ralph Kleuser, Cologne (DE)

(73) Assignee: DEUTZ Aktiengesellschaft, Cologne (DE)

( * ) Notice: Subject to any disclaimer, the term of this patent is extended or adjusted under 35 U.S.C. 154(b) by 0 days.

(21) Appl. No.: 18/136,927

(22) Filed: Apr. 20, 2023

(65) Prior Publication Data
US 2023/0340933 A1    Oct. 26, 2023

(30) Foreign Application Priority Data

Apr. 26, 2022    (DE) .................. 10 2022 001 464.5

(51) Int. Cl.
*F02M 61/14*    (2006.01)
*F02F 1/24*    (2006.01)

(52) U.S. Cl.
CPC .......... *F02M 61/145* (2013.01); *F02F 1/242* (2013.01); *F02M 2200/855* (2013.01)

(58) Field of Classification Search
CPC .............. F02M 61/14; F02M 61/145; F02M 2200/855; F02F 1/24242
See application file for complete search history.

(56) References Cited

U.S. PATENT DOCUMENTS

| | | | |
|---|---|---|---|
| 4,519,371 A | 5/1985 | Nagase et al. | |
| 5,058,555 A * | 10/1991 | Haboush, II | F02M 69/465 123/456 |
| 2002/0162538 A1* | 11/2002 | Krause | F02M 61/14 123/470 |

(Continued)

FOREIGN PATENT DOCUMENTS

| | | |
|---|---|---|
| DE | 2208646 A | 8/1973 |
| DE | 202008013696 U1 | 12/2008 |

(Continued)

*Primary Examiner* — Hai H Huynh
*Assistant Examiner* — Johnny H Hoang
(74) *Attorney, Agent, or Firm* — Davidson Kappel LLC

(57) ABSTRACT

A cylinder head for an internal combustion engine, in particular a hydrogen-powered internal combustion engine, includes a cylinder head system that includes an intake duct and a fuel inlet aperture, the fuel inlet aperture opening into the intake duct, an injector holder that is detachably connected to the cylinder head system and that includes an injector receiving borehole, an injector that is accommodated in the injector receiving borehole and braced against the injector holder with the aid of clamping means, and a tubular plug-in piece that is situated between the injector holder and the cylinder head system in such a way that a discharge opening of the injector and the fuel inlet aperture of the cylinder head system are fluidically connected to one another via the via the plug-in piece.

16 Claims, 4 Drawing Sheets

(56) References Cited

U.S. PATENT DOCUMENTS

| | | | | |
|---|---|---|---|---|
| 2004/0003798 A1* | 1/2004 | Mutschler | ............ | F02M 55/004 |
| | | | | 123/456 |
| 2004/0020470 A1* | 2/2004 | Norgauer | ............... | F02M 61/14 |
| | | | | 123/470 |
| 2005/0229874 A1* | 10/2005 | Yonezawa | ............... | F01P 3/202 |
| | | | | 123/41.74 |
| 2006/0162691 A1* | 7/2006 | Ishida | .................... | F02M 9/127 |
| | | | | 123/470 |
| 2007/0175688 A1* | 8/2007 | Ishii | .................... | F02M 69/047 |
| | | | | 123/585 |
| 2008/0271713 A1* | 11/2008 | Morris | .................... | F02M 61/14 |
| | | | | 123/470 |
| 2010/0154746 A1* | 6/2010 | Fischer | ................. | F02M 61/14 |
| | | | | 123/456 |
| 2013/0036607 A1* | 2/2013 | Takasaki | .............. | F02M 55/025 |
| | | | | 29/888.01 |
| 2013/0340713 A1 | 12/2013 | Stahr et al. | | |
| 2014/0021272 A1 | 1/2014 | Ryan et al. | | |
| 2014/0312096 A1* | 10/2014 | Kinney | .................... | B23K 5/04 |
| | | | | 228/103 |
| 2016/0025056 A1* | 1/2016 | Smaldone | .............. | F02M 61/14 |
| | | | | 123/470 |
| 2016/0290279 A1 | 10/2016 | Brunner et al. | | |
| 2018/0030942 A1* | 2/2018 | Madsen | ............... | F02M 61/145 |
| 2020/0049100 A1* | 2/2020 | Sugimoto | ............. | F02M 21/02 |
| 2021/0310453 A1* | 10/2021 | Pasquali | ............. | F02M 61/168 |
| 2021/0381478 A1* | 12/2021 | Werger | ................. | F02M 61/14 |

FOREIGN PATENT DOCUMENTS

| | | |
|---|---|---|
| DE | 11 2017 001678 T5 | 12/2018 |
| EP | 0915248 A1 | 5/1999 |
| JP | S6174672 U | 4/1986 |
| WO | WO2012084323 A1 | 6/2012 |
| WO | WO 2015067550 A1 | 5/2015 |

* cited by examiner

CYLINDER HEAD FOR AN INTERNAL COMBUSTION ENGINE

This claims the benefit of German Patent Application DE 10 2022 001 464.5, filed Apr. 26, 2022 which is hereby incorporated by reference herein.

The present disclosure relates to a cylinder head for an internal combustion engine, in particular a hydrogen-powered internal combustion engine.

BACKGROUND

Cylinder heads close off the combustion chamber of internal combustion engines at an end opposite from the piston. The cylinder heads include the inlet channels, also referred to as intake ducts, and the outlet channels for the gas exchange processes in the combustion chamber of the internal combustion engine. The formation of the mixture of fuel and intake air may in principle take place in the intake manifold or in the cylinder. In both cases, the injection of the fuel takes place via injectors that are supported by the cylinder head.

A cylinder head including a fire deck on the combustion chamber side and an injector sleeve, detachably connected to the cylinder head, for accommodating an injection device is known from WO 2015 067 550 A1. At a first end on the fire deck side, the injector sleeve is screwed to the fire deck via a first screw connection, and in the area of the first end includes at least one radially protruding first support area with a first support surface that faces the fire deck and rests on a first countersurface that is formed by the cylinder head.

A cylinder head that includes a fuel injection device with an injection opening is known from DE 11 2017 001 678 T5. The cylinder head includes a mounting hole into which a sleeve-shaped plastic cap is inserted, so that a through hole through which the fuel injection device extends opens into the combustion chamber of an internal combustion engine.

SUMMARY

On this basis, the object underlying the present disclosure is to provide a cylinder head for an internal combustion engine that is easy to manufacture and install.

The underlying object is achieved by a cylinder head for an internal combustion engine, in particular a hydrogen-powered internal combustion engine, the cylinder head including the following: a cylinder head system that includes an intake duct and a fuel inlet aperture, the fuel inlet aperture opening into the intake duct, an injector holder that is detachably connected to the cylinder head system and that includes an injector receiving borehole, an injector that is accommodated in the injector receiving borehole and braced against the injector holder with the aid of clamping means, and a tubular plug-in piece that is situated between the injector holder and the cylinder head system in such a way that a discharge opening of the injector and the fuel inlet aperture of the cylinder head system are fluidically connected to one another via the plug-in piece.

The cylinder head according to the present disclosure has the advantage that the injector may be pre-installed in the injector holder. In addition, the machining tolerance requirements for the connection dimensions between the cylinder head system and the injector holder may be kept low, since they may be compensated for via the tubular plug-in piece. The cylinder head according to the present disclosure is thus easy to manufacture and ensures simple installation.

In one possible specific embodiment of the cylinder head, the injector holder may include a fuel delivery aperture, the injector receiving borehole opening into the fuel delivery aperture. The tubular plug-in piece may be situated between the injector holder and the cylinder head system in such a way that the discharge opening of the injector and the fuel inlet aperture of the cylinder head system are fluidically connected to one another via the fuel delivery aperture and the plug-in piece.

In a further possible specific embodiment, a tubular spring element may be provided which is situated between the injector holder and the plug-in piece in such a way that the plug-in piece is resiliently supported on the injector holder in the axial direction with respect to a longitudinal axis of the plug-in piece. The plug-in piece at a first end may be in contact with the cylinder head system, and at an opposite, second end may be in contact with the tubular spring element. A further reduction in the machining tolerance requirements for the connection dimensions between the cylinder head system and the injector holder may be achieved by use of the spring element. In addition, via the spring element an axial displacement of the plug-in piece due to pressure fluctuations may be prevented.

Alternatively or in combination, a tubular spring element may be provided which is situated between the plug-in piece and the cylinder head system, so that the plug-in piece is resiliently supported on the injector holder. At a first end, the plug-in piece may be in contact with the injector holder, and at an opposite, second end may be in contact with the tubular spring element.

In a likewise possible specific embodiment, the injector holder may include a plug-in piece receptacle in which the plug-in piece is seated. Alternatively or in combination, the cylinder head system may include a plug-in piece receptacle in which the plug-in piece is seated.

In a further possible specific embodiment, the injector holder may include a pressure accumulator that is fluidically connectable to a fuel source and fluidically connected to the injector.

It is also possible for the injector holder to include multiple injector receiving boreholes, in each of which an injector is accommodated. Alternatively or in combination, the injector holder may include a pressure accumulator that is fluidically connectable to a fuel source and fluidically connected in each case to the injectors. The pressure accumulator may extend through the injector holder as a cylindrical buffer borehole. The buffer borehole may be embedded in the injector holder, or subsequently introduced into the injector holder by mechanical machining.

The buffer borehole may be closed at at least one end via a closure element. If the cylindrical buffer borehole is designed as a blind hole, at a first end the buffer borehole may be closed by a first closure element, and at a second end may be closed by the blind hole base. If the cylindrical buffer borehole is designed as a through borehole, at a first end the buffer borehole may be closed by a first closure element, and at a second end may be closed by a second closure element.

The core of the buffer borehole may be situated transversely, in particular askew, in each case with respect to a longitudinal axis of the injector receiving boreholes. It is conceivable that in a projection, the core of the buffer borehole and the respective longitudinal axes of the injector receiving boreholes enclose an angle of 90°.

In one possible specific embodiment, the fuel inlet aperture may open into the intake duct via a tubular injection tube. The injection tube may be joined to the cylinder head system, in particular by screwing, gluing in, or pressing in.

In addition, the cylinder head system may include a base element and an intake manifold, the intake duct being at least partially formed by the base element and the intake manifold.

BRIEF SUMMARY OF THE DRAWINGS

One exemplary embodiment is explained below with reference to the figures.

DETAILED DESCRIPTION

Figure 1:
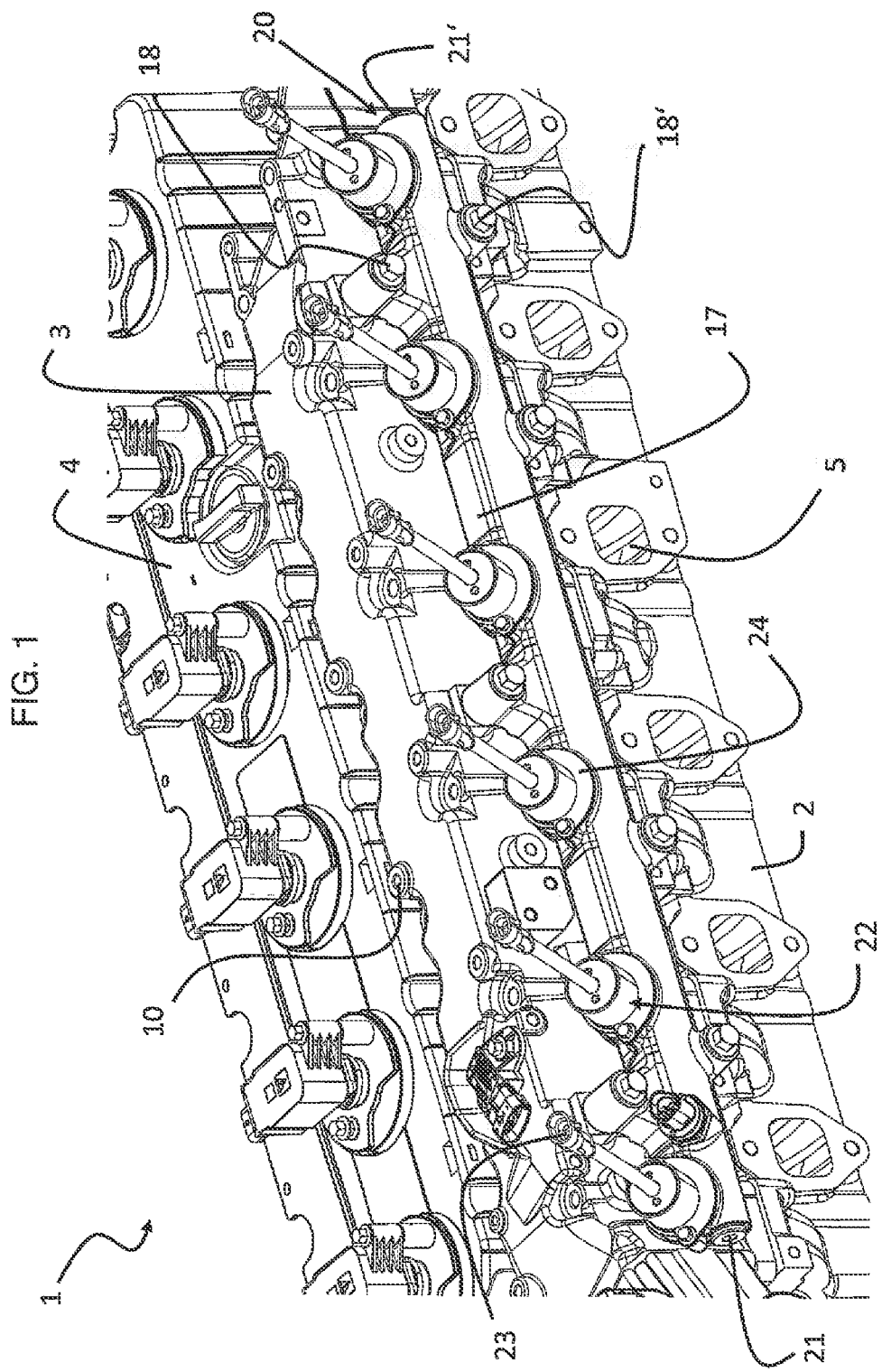
FIG. 1 shows a perspective view of a cylinder head according to the present disclosure for a six-cylinder internal combustion engine.
Figure 2:
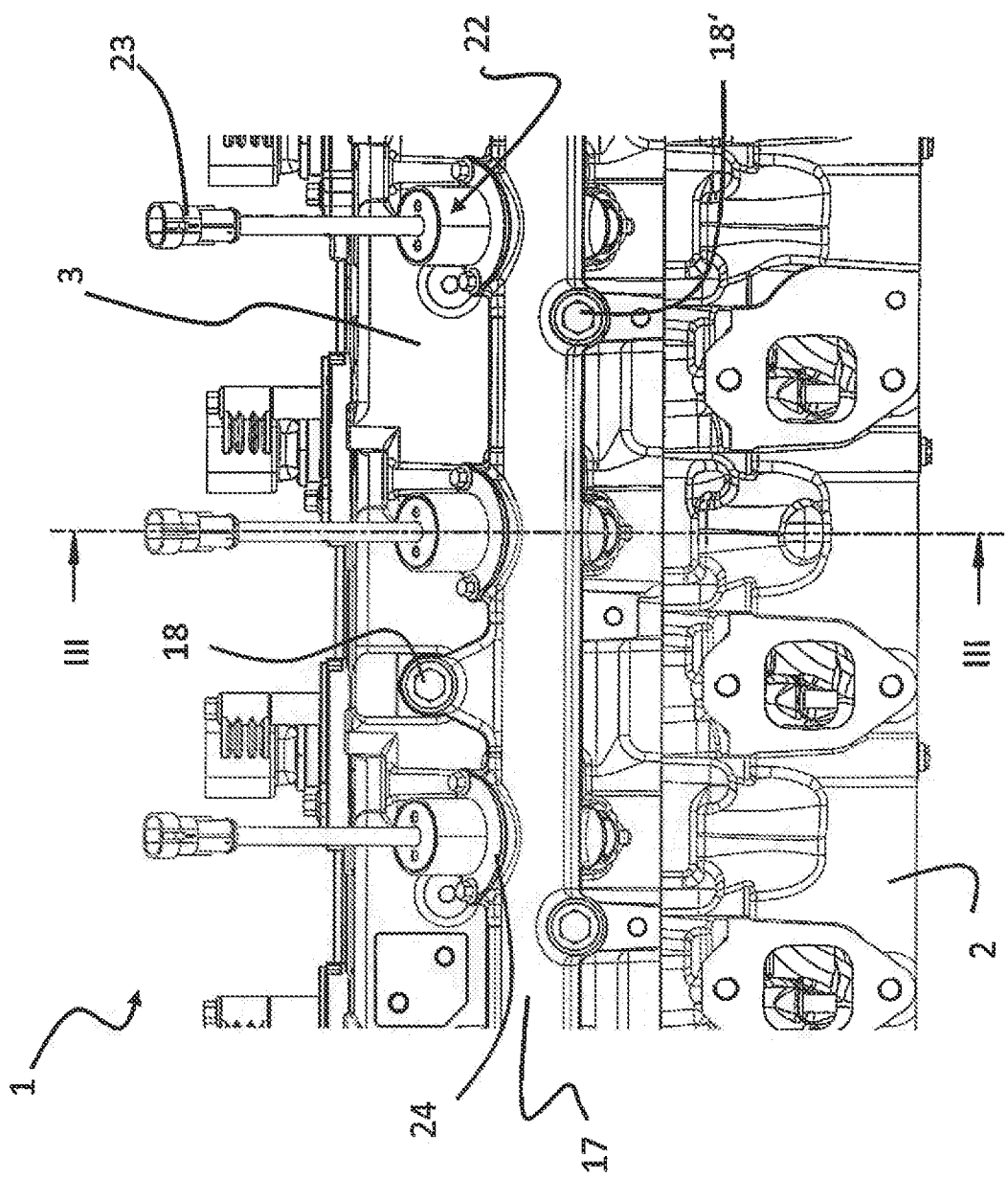
FIG. 2 shows a detail of a side view of the cylinder head from FIG. 1.
Figure 3:
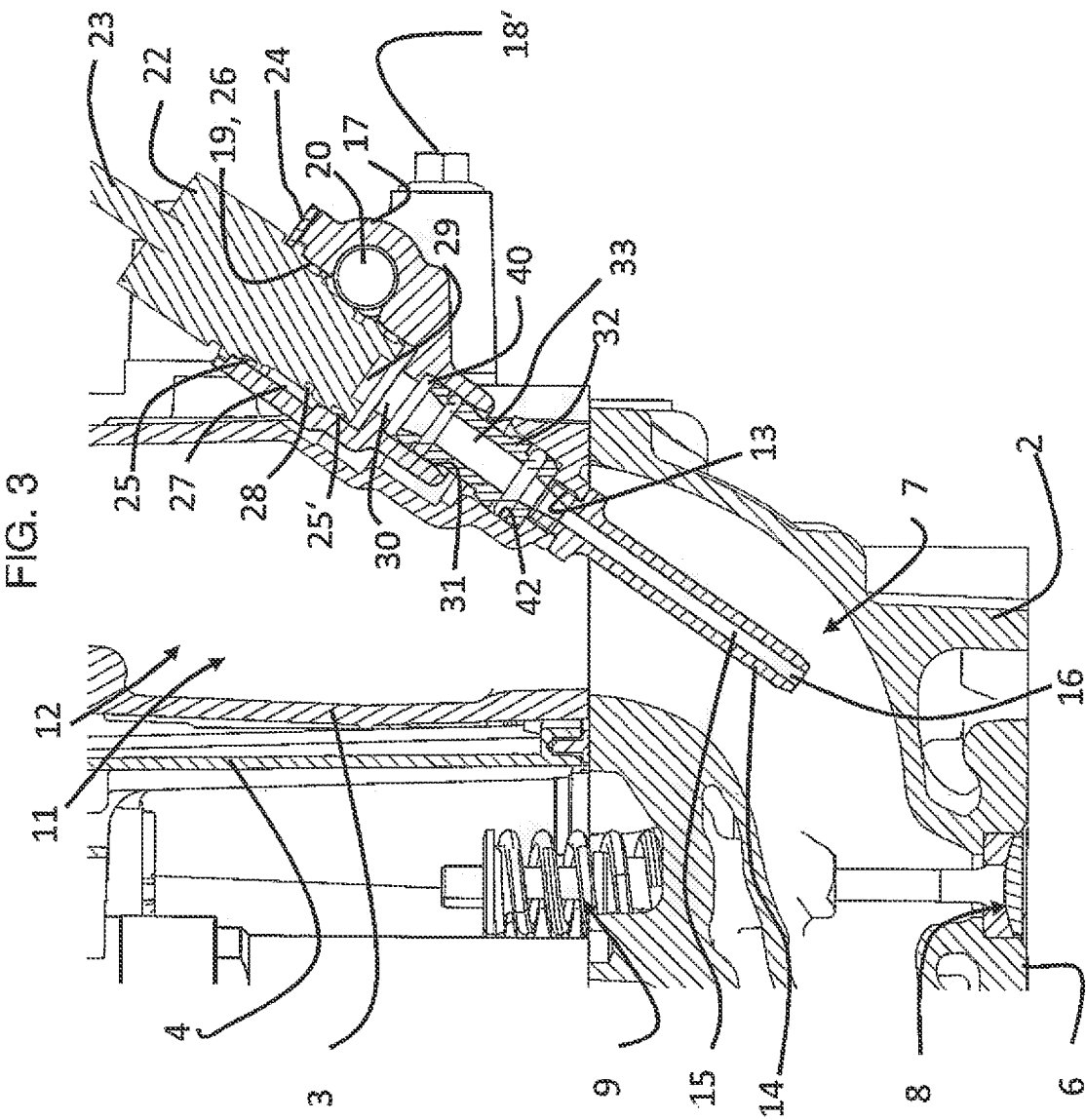
FIG. 3 shows a sectional view of the cylinder head from FIG. 1 along section plane III-III in FIG. 2.
Figure 4:
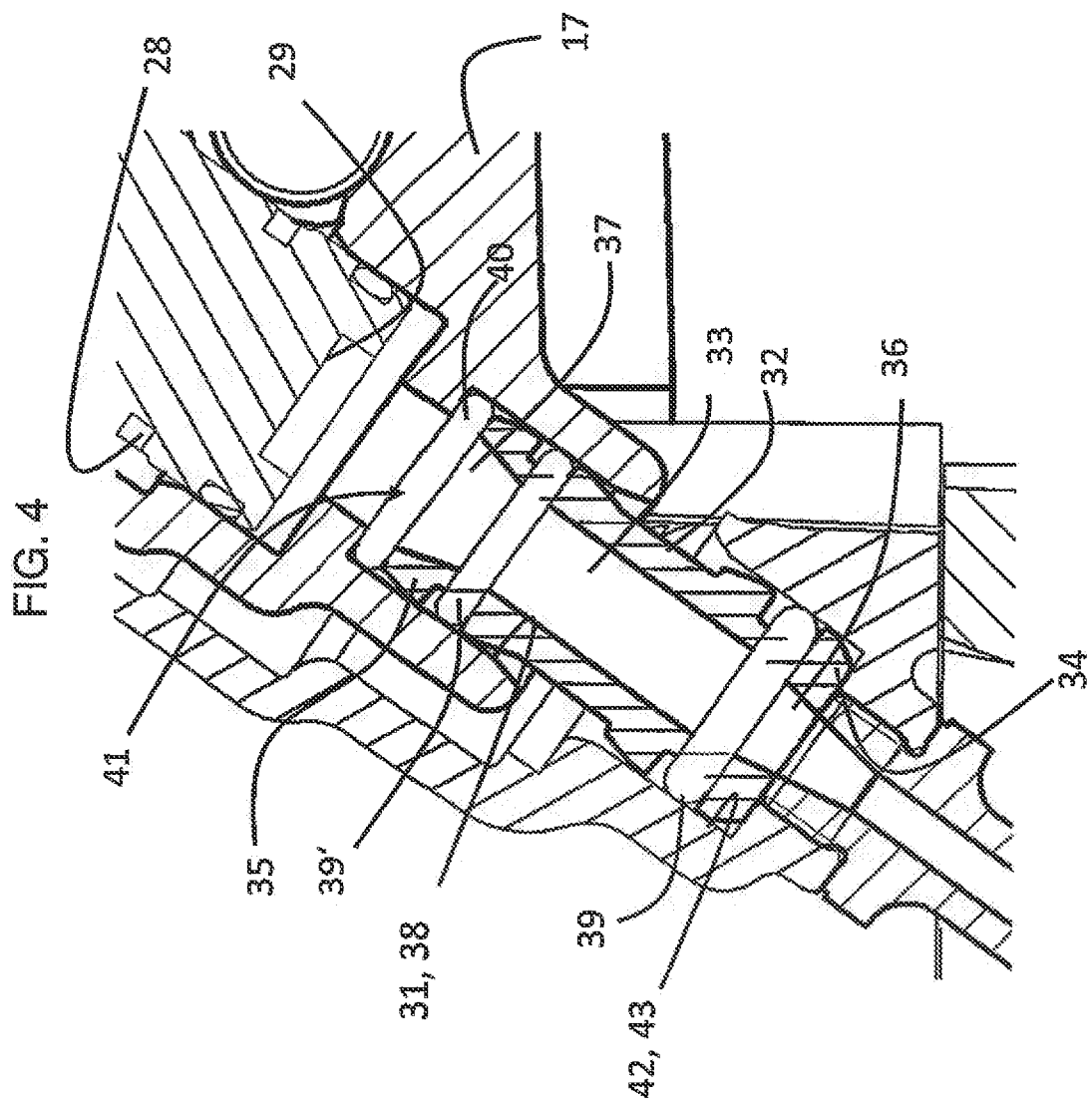
FIG. 4 shows a detailed view of FIG. 3.

FIGS. 1 through 4, which are described together below, show a cylinder head according to the present disclosure for a six-cylinder internal combustion engine. The cylinder head includes a cylinder head system 1 with a base element 2, an intake manifold 3, and a valve train cover 4.

Base element 2 includes a fire deck 6 via which a combustion chamber (not illustrated) of the internal combustion engine may be closed off. Base element 2 is made of a cast material. An inlet channel 7 is situated, in particular embedded, in base element 2. Inlet channel 7 penetrates fire deck 6. Combustion chamber inlet 8 thus formed in fire deck 6 may be selectively closed or opened, in a manner known to those skilled in the art, by use of an intake valve system 9. An outlet channel 5 is situated, in particular embedded, in base element 2. Outlet channel 5 penetrates fire deck 6. Combustion chamber outlet 5 thus formed in fire deck 6 may be selectively closed or opened, in a manner known to those skilled in the art, by use of an exhaust valve system.

Intake manifold 3 is connected to base element 2 via connecting means 10. Intake manifold 3 likewise includes an inlet channel 11, which together with inlet channel 7 of base element 2 forms an intake duct 12. Intake duct 12 fluidically connects combustion chamber inlet 8 to an intake air source, for example by use of a filter element, a compressor, or a turbocharger. In this regard, base element 2 and intake manifold 3 may be referred to as part of the cylinder head system.

Cylinder head system 1 includes a fuel inlet aperture 13. In the present case, intake manifold 3 includes fuel inlet aperture 13, it also being conceivable for fuel inlet aperture 13 to be formed in base element 2.

Fuel inlet aperture 13 opens into intake duct 12 via an injection tube 14. In the present case, injection tube 14 is screwed into a female thread that is integrated into fuel inlet aperture 13. However, any other detachable or undetachable connection is also conceivable, it being possible, for example, for injection tube 14 to be adhesively bonded to cylinder head system 1 or pressed into fuel inlet aperture 13. Sealing means, not illustrated, are provided between injection tube 14 and cylinder head system 1. Alternatively, a metallic compression seal may be present due to the connection between injection tube 14 and cylinder head system 1.

Injection tube 14 includes a straight channel 15 that fluidically connects fuel inlet aperture 13 to an outlet opening 16 of injection tube 14. Channel 15 extends along a longitudinal axis of injection tube 14. The entry of fuel that is introduced via fuel inlet aperture 13 thus takes place closer to combustion chamber inlet 8, which results in an advantageous mixture formation as well as cooling of base element 2 in the area of combustion chamber inlet 8. In principle, it is also conceivable for injection tube 14 to have a shape that is not straight, and in particular to be curved or to have an S shape.

An injector holder 17 is detachably fastened to cylinder head system 1. In the present case, injector holder 17 is screwed to intake manifold 3 via connecting means 18, 18'. In principle, it is also conceivable for injector holder 17 to be screwed to intake manifold 3 via connecting means 18, and to be screwed to base element 2 via connecting means 18'. In addition, it is conceivable for injector holder 17 to be detachably connected, via connecting means, to at least one of the following: base element 2, intake manifold 3, valve train cover 4, and outlet tube 5.

Injector holder 17 includes multiple injector receiving boreholes 19. In the present case, injector holder 17 includes six injector receiving boreholes 19, corresponding to the number of cylinders in the internal combustion engine, without being limited thereto. Injectors 22 are accommodated in each case in injector receiving boreholes 19. Injectors 22 are braced against injector holder 17 via clamping means 24. In the present case, clamping means 24 are designed as clamping claws. Injectors 22 include an electrical connection 23 via which injectors 22 may be connected to a control unit (not illustrated). Injectors 22 may be activated via the control unit.

Injector receiving boreholes 19 are fluidically connected to one another via a buffer borehole 20. Buffer borehole 20 is used as a shared pressure accumulator for injector receiving boreholes 19. In the present case, buffer borehole 20 is designed as a through hole. Buffer borehole 20 is closed off in a sealing manner at each of its opposite ends by a closure element 21, 21'. Buffer borehole 20 is fluidically connectable to a fuel source, for example a fuel pump, via lines (not visible in the figures), and may be acted on with pressure via the fuel source. Instead of providing one of closure elements 21, 21', it is conceivable to provide a connection to the line to the fuel source.

The core of buffer borehole 20 is situated askew with respect to the respective longitudinal axes of injector receiving boreholes 19, in a projection, the core of buffer borehole 20 and the respective longitudinal axes of injector receiving boreholes 19 enclosing an angle of 90°. The offset between the core of buffer borehole 20 and the respective longitudinal axes of injector receiving boreholes 19 is greater than the radius of buffer borehole 20. Buffer borehole 20 with a partial section intersects injector receiving boreholes 19.

Individual injectors 22 are in each case sealed off with respect to corresponding injector receiving boreholes 19 via two sealing elements 25, 25'. The two sealing elements 25, 25' are situated in such a way that a sealed-off space 27 that is fluidically connected to buffer borehole 20 is formed between an inner wall 26 of injector receiving borehole 19 and injector 22. In the present case, sealed-off space 27 is designed as an annular space that surrounds injector 22. The annular space intersects buffer borehole 20. The annular space thus merges into buffer borehole 20, so that a fluidic connection is established.

Standard injectors may be used as injectors 22. In the present case, injectors 22 include a schematically illustrated inlet 28 that opens into sealed-off space 27 and/or buffer borehole 20. Injectors 22 also include a discharge opening 29, which may also be referred to as an injection opening, via which injectors 22 may deliver fuel. The delivery of the fuel via discharge opening 29 takes place in the direction of a fuel delivery aperture 30 of injector holder 17. Fuel delivery aperture 30 of injector holder 17 adjoins injector receiving borehole 19. In other words, injector receiving borehole 19 opens into fuel delivery aperture 30 of injector holder 17. In the present case, fuel delivery aperture 30 has a circular cross section with a constant diameter, without being limited thereto. However, in principle it is also conceivable for discharge opening 29 of injectors 22 to be situated at least partially within fuel delivery aperture 30.

Fuel delivery aperture 30 is fluidically connected to fuel inlet aperture 13 via a plug-in piece 32. For this purpose, plug-in piece 32 with a first end 34 is seated in a plug-in piece receptacle 42 of cylinder head system 1, which in the present case is designed as a cylindrical borehole. First end 34 of plug-in piece 32 on the head side is in contact with cylinder head system 1. In the present case, first end 34 of plug-in piece 32 on the head side is in contact with intake manifold 3. A sealing element 39 is provided between first end 34 of plug-in piece 32 and an inner wall 43 of plug-in piece receptacle 42. Sealing element 39 in the present case is designed as an O-ring. However, it is also conceivable for sealing element 39 to be implemented as one or multiple sealing lips that are vulcanized onto plug-in piece 32.

With a second end 35, plug-in piece 32 is seated in a plug-in piece receptacle 31 of injector holder 17, which in the present case is designed as a cylindrical borehole. Second end 35 of plug-in piece 32 on the head side is in contact with a spring element 40. Spring element 40 is situated between plug-in piece 32 and injector holder 17. Spring element 40 has a tubular or ring-shaped design, for example. Accordingly, spring element 40 includes an aperture which in particular has a circular cross section with a constant diameter. Spring element 40 may be made of a metallic material or a plastic. A sealing element 39' is provided between second end 35 of plug-in piece 32 and an inner wall 38 of plug-in piece receptacle 31. In the present case, sealing element 39' is designed as an O-ring. However, it is also conceivable for sealing element 39' to be implemented as one or multiple sealing lips that are vulcanized onto plug-in piece 32. In this context, it is noted that sealing element 39, 39' and spring element 40 are not illustrated in cross section in FIGS. 3 and 4.

Plug-in piece 32 includes a channel 33 that fluidically connects fuel inlet aperture 13 to fuel delivery aperture 30 via spring element 40. Channel 33 at a first end includes a first conical end section 36, and at a second, opposite end includes a second conical end section 37. First conical end section 36 and second conical end section 37 are connected to one another via a cylindrical section.

First conical end section 36 narrows in the direction of an opening that points in the direction of fuel inlet aperture 13, and expands in the direction of the cylindrical section of channel 33. The opening of first conical end section 36 and the opening of fuel inlet aperture 13 directly adjoin one another. The cross section of the opening of first conical end section 36 corresponds to the cross section of fuel inlet aperture 13.

Second conical end section 37 expands in the direction of an opening that points in the direction of tubular spring element 40, and narrows in the direction of the cylindrical section of channel 33. The cross section of the opening of second conical end section 37 corresponds to the cross section of fuel delivery aperture 30 and/or to the cross section of the aperture of spring element 40. In the present case, fuel delivery aperture 30 and the aperture of spring element 40 have the same diameter.

Fuel delivery aperture 30, the aperture of spring element 40, and channel 33 of plug-in piece 32 thus form a connecting channel 41 that fluidically connects discharge opening 29 of injector 22 to fuel inlet aperture 13.

First end 34 of plug-in piece 32 and second end 35 of plug-in piece 32 have different diameters, so that a defined installed position is achieved according to the key-lock principle. Plug-in piece 32 may therefore be inserted between injector holder 17 and cylinder head system 1 only in such a way that channel 33 is oriented as described above.

LIST OF REFERENCE NUMERALS 1 cylinder head system
2 base element
3 intake manifold
4 valve train cover
5 outlet tube
6 fire deck
7 inlet channel
8 combustion chamber inlet
9 intake valve system
10 connecting means
11 inlet channel
12 intake duct
13 fuel inlet aperture
14 injection tube
15 channel
16 outlet opening
17 injector holder
18, 18' connecting means
19 injector receiving borehole
20 buffer borehole
21, 21' closure element
22 injector
23 connection
24 clamping means
25, 25' sealing element
26 inner wall
27 space
28 inlet
29 discharge opening
30 fuel delivery aperture
31 plug-in piece receptacle
32 plug-in piece
33 channel
34 end
35 end
36 conical end section
37 conical end section
38 inner wall
39, 39' sealing element
40 spring element
41 connecting channel
42 plug-in piece receptacle
43 inner wall

What is claimed is:
1. A cylinder head for an internal combustion engine comprising:
 a cylinder head system including an intake duct and a fuel inlet aperture, the fuel inlet aperture opening into the intake duct;
 an injector holder that is detachably connected to the cylinder head system and that includes an injector receiving borehole;

an injector that is accommodated in the injector receiving borehole and braced against the injector holder via a clamp; and a tubular plug-in piece that is situated between the injector holder and the cylinder head system, the tubular plug-in piece fluidically connecting a discharge opening of the injector and the fuel inlet aperture of the cylinder head system to one another, wherein the injector holder includes a fuel delivery aperture, the injector receiving borehole opening into the fuel delivery aperture.

2. The cylinder head as recited in claim 1, wherein the tubular plug-in piece is situated between the injector holder and the cylinder head system, the tubular plug-in piece fluidically connecting the fuel delivery aperture and the fuel inlet aperture of the cylinder head system to one another.

3. The cylinder head as recited in claim 1, wherein a tubular spring element is provided that is situated between the injector holder and the plug-in piece, tubular spring element resiliently supporting the tubular plug-in piece on the injector holder in an axial direction with respect to a longitudinal axis of the tubular plug-in piece.

4. The cylinder head as recited in claim 3, wherein the tubular plug-in piece at a first end is in contact with the cylinder head system, and at an opposite, second end is in contact with the tubular spring element.

5. The cylinder head as recited in claim 1, wherein a tubular spring element is provided that is situated between the plug-in piece and the cylinder head system, the tubular spring element resiliently supporting the plug-in piece on the injector holder in an axial direction with respect to a longitudinal axis of the plug-in piece.

6. The cylinder head as recited in claim 5, wherein the tubular plug-in piece at a first end is in contact with the injector holder, and at an opposite, second end is in contact with the tubular spring element.

7. The cylinder head as recited in claim 1, wherein the injector holder includes a plug-in piece receptacle in which the tubular plug-in piece is seated.

8. The cylinder head as recited in claim 1, wherein the cylinder head system includes a plug-in piece receptacle in which the tubular plug-in piece is seated.

9. The cylinder head as recited in claim 1, wherein the injector holder includes a pressure accumulator that is fluidically connectable to a fuel source and fluidically connected to the injector.

10. The cylinder head as recited in claim 1, wherein the injector holder includes multiple injector receiving boreholes, in each of which an injector is accommodated, and the injector holder includes a pressure accumulator that is fluidically connectable to a fuel source and fluidically connected in each case to the injectors.

11. The cylinder head as recited in claim 10, wherein the pressure accumulator extends through the injector holder as a cylindrical buffer borehole, in particular the buffer borehole being closed at at least one end via a closure element.

12. The cylinder head as recited in claim 1, wherein the fuel inlet aperture opens into the intake duct via a tubular injection tube.

13. The cylinder head as recited in claim 12, wherein the injection tube is joined to the cylinder head system by screwing, gluing in, or pressing in.

14. The cylinder head as recited in claim 1, wherein the cylinder head system includes a base element and an intake manifold, the intake duct being at least partially formed by the base element and the intake manifold.

15. A cylinder head for an internal combustion engine comprising:
a cylinder head system including an intake duct and a fuel inlet aperture, the fuel inlet aperture opening into the intake duct;
an injector holder that is detachably connected to the cylinder head system and that includes an injector receiving borehole;
an injector that is accommodated in the injector receiving borehole and braced against the injector holder via a clamp; and
a tubular plug-in piece that is situated between the injector holder and the cylinder head system, the tubular plug-in piece fluidically connecting a discharge opening of the injector and the fuel inlet aperture of the cylinder head system to one another,
the tubular plug-in piece extending out of the injector holder.

16. A cylinder head for an internal combustion engine comprising:
a cylinder head system including an intake duct and a fuel inlet aperture, the fuel inlet aperture opening into the intake duct;
an injector holder that is detachably connected to the cylinder head system and that includes an injector receiving borehole;
an injector that is accommodated in the injector receiving borehole and braced against the injector holder via a clamp; and
a tubular plug-in piece that is situated between the injector holder and the cylinder head system, the tubular plug-in piece fluidically connecting a discharge opening of the injector and the fuel inlet aperture of the cylinder head system to one another,
the discharge opening of the injector being spaced from an inlet of the tubular plug-in piece.

* * * * *